United States Patent [19]
Atherton

[11] Patent Number: 6,078,364
[45] Date of Patent: Jun. 20, 2000

[54] LIQUID CRYSTAL DISPLAY WITH HIGH CAPACITANCE PIXEL

[75] Inventor: James Harold Atherton, Ringoes, N.J.

[73] Assignee: Sarnoff Corporation, Princeton, N.J.

[21] Appl. No.: 08/472,836

[22] Filed: Jun. 7, 1995

Related U.S. Application Data

[62] Division of application No. 08/277,824, Jul. 20, 1994, Pat. No. 5,483,366.

[51] Int. Cl.⁷ .......................... G02F 1/1343; G02F 1/136
[52] U.S. Cl. ............................. 349/38; 349/42; 349/46
[58] Field of Search .................... 359/59, 87, 54; 345/92; 257/66, 72; 349/38, 39, 42, 139, 46

[56] References Cited

U.S. PATENT DOCUMENTS

| | | | |
|---|---|---|---|
| 4,968,119 | 11/1990 | Stewart | 359/59 |
| 5,054,887 | 10/1991 | Kato et al. | 359/59 |
| 5,055,899 | 10/1991 | Wakai et al. | 359/87 |
| 5,159,477 | 10/1992 | Shimada et al. | 359/59 |
| 5,245,452 | 9/1993 | Nakamura et al. | 359/59 |
| 5,339,181 | 8/1994 | Kim et al. | 359/59 |
| 5,351,145 | 9/1994 | Miyata et al. | 359/59 |

FOREIGN PATENT DOCUMENTS

| | | | |
|---|---|---|---|
| 1-167733 | 7/1989 | Japan | 359/59 |
| 4264529 | 9/1992 | Japan | 359/59 |

OTHER PUBLICATIONS

K. Suzuki,"High Temperature TFT Array Structures" SID International Symposium, Jun. 14–16, 1994, San Jose, CA SID 94 Digest, pp. 167–170.

Lipton et al., "Matrix–Addressed Liquid Cyrstal Display Panel", 1973 SID International Symposium Digest of Technical Papers, pp. 46–48.

*Primary Examiner*—Walter Malinowski
*Attorney, Agent, or Firm*—William J. Burke

[57] ABSTRACT

A liquid crystal display includes a base plate having a plurality of pixels on a surface thereof with the pixels arranged in an array of spaced rows and columns. Each of the pixels includes a substantially rectangular region of polycrystalline silicon. A separate select line of polycrystalline silicon extends over and across the polycrystalline silicon regions of each row of pixels adjacent one side of the polycrystalline silicon region. The select lines has two extensions extending over and along two opposite sides of each polycrystalline silicon region. A layer of a dielectric material extends between the polycrystalline silicon regions and the first lines and the extensions of the first lines. Each of the first lines and its extensions forms a capacitor with the respective polycrystalline silicon region of each pixel. Data lines extend along the rows of the pixels and are electrically connected to each polycrystalline silicon region in its respective column of pixels.

13 Claims, 4 Drawing Sheets

6,078,364

LIQUID CRYSTAL DISPLAY WITH HIGH CAPACITANCE PIXEL

This is a division of application Ser. No. 08/277,824, filed Jul. 20, 1994, now U.S. Pat. No. 5,483,366. +gi This invention was made with Government support under Contract No. F33615-92-C-3804 awarded by the U.S. Department of the Air Force. The Government has certain rights in this invention.

The present invention relates to a liquid crystal display, and, more particularly, to a liquid crystal display with a high capacitance pixel.

BACKGROUND OF THE INVENTION

A liquid crystal display, in general, comprises a pair of spaced, parallel plates, generally of glass, each having an electrode of a conductive material on its surface facing the other plate, and a liquid crystal material between the electrodes. The electrode on one of the plates, generally the back plate, is divided into a plurality of individual, spaced areas which are arranged in a plurality of spaced parallel rows and columns. Each of the areas of the electrode forms a pixel of the display. Between each pair of adjacent columns of the pixel areas is a conductive line which forms a data line and which is electrically connected to each of the pixel areas in an adjacent column. Between each pair of adjacent rows of the pixel areas is a conductive line which forms a select line and which is electrically connected to each of the pixel areas in an adjacent row. Generally, each data line is electrically connected to each pixel area through a MOS transistor, and each select line is electrically connected to each pixel area through a capacitor.

Referring to FIG. 1, there is shown a top plan view of one pixel of a prior art liquid crystal display 10. The liquid crystal display 10 comprises a base plate 12 of an insulating material, such as glass, having on a surface thereof, an area 14 of a conductive material, such as polycrystalline silicon. The area 14 forms a pixel of the liquid crystal display 10. It should be understood that the liquid crystal display 10 includes a plurality of the pixel areas 14 arranged in an array of spaced rows and columns. The pixel area 14 is shown as being substantially in the form of a rectangle. Extending across the top portion of the pixel area 14 is a select line 16 of a conductive material, such as polycrystallinie silicon. The select line 16 is insulated from the pixel area 14 by a layer of a dielectric material (not shown), such as silicon oxide, preferably silicon dioxide, or silicon nitride. Extending along one side of the pixel area 14 is a data line 18 of an electrically conductive material, such as a metal.

The data line 18 is electrically connected to the pixel area 14 by a MOS transistor 20. The MOS transistor 20 is formed by a strip 22 of polyciystalline silicon extending from the pixel area 14, across which extends the polycrystalline silicon select line 16' of the next adjacent pixel area 14'. The select line 16' is insulated from the strip 22 by a layer of insulating material (not shown), such as silicon oxide, preferably silicon dioxide. Thus the select line 16' serves as the gate of the MOS transistor 20. The data line 18 is electrically connected to the strip 22 on the side of the select line 16' away from the pixel area 14. Thus, the portions of the strip 22 at opposite sides of the select line 16' serve as the source and drain of the MOS transistor 20.

The portion of the select line 16 which extends across the pixel area 14 and which is spaced from the pixel area 14 by the dielectric material forms a capacitor with the pixel area 14. The capacitor serves to stabilize the pixel voltage in the presence of leakage current and charge noise. To provide improved stabilization, it is desirable to have as large a capacitor as possible. One means for increasing the capacitance is to increase the size of the select line 16 so that it extends over a larger portion of the pixel area 14. However, this would take up a larger portion of the pixel area 14 and thereby decrease the active area of the pixel area 14 and decrease the aperture size of the pixel. If the pixel area 14 is made larger to allow for increased capacitance without decreasing the active area, the overall size of the display would be increased. Therefore, it would be desirable to be able to increase the capacitance of the capacitor between the select line and the pixel area without decreasing the active area and aperture size of the pixel and without increasing the overall size of the display.

SUMMARY OF THE INVENTION

The present invention is directed to a liquid crystal display which includes a base plate having a surface. At least one pixel is on the surface of the base plate and includes a region of a conductive material having a plurality of sides. A conductive first line extends over and across the region adjacent one side thereof. The first line has at least one extension extending therefrom over and across another side of the region. A layer of a dielectric material is between the region and the first line and the extension to form a capacitor between the region and the first line and its extension.

The present invention is also directed to a liquid crystal display which includes a base plate having a surface. A plurality of pixels are on the surface of the base plate and are arranged in an array of spaced rows and columns. Each of the pixels includes a region of a conductive material having a plurality of sides. A separate conductive first line extends over and along one side of each of the conductive regions in each row of pixels. The first line has at least one conductive extension extending therethrough over and along another side of each of the conductive regions in its respective row of pixels. A layer of a dielectric material extends between the conductive regions and the first lines and extensions of the first lines. Each of the first lines and its extensions forms a capacitor with each of the conductive regions in its respective row of pixels.

DETAILED DESCRIPTION

Figure 2:
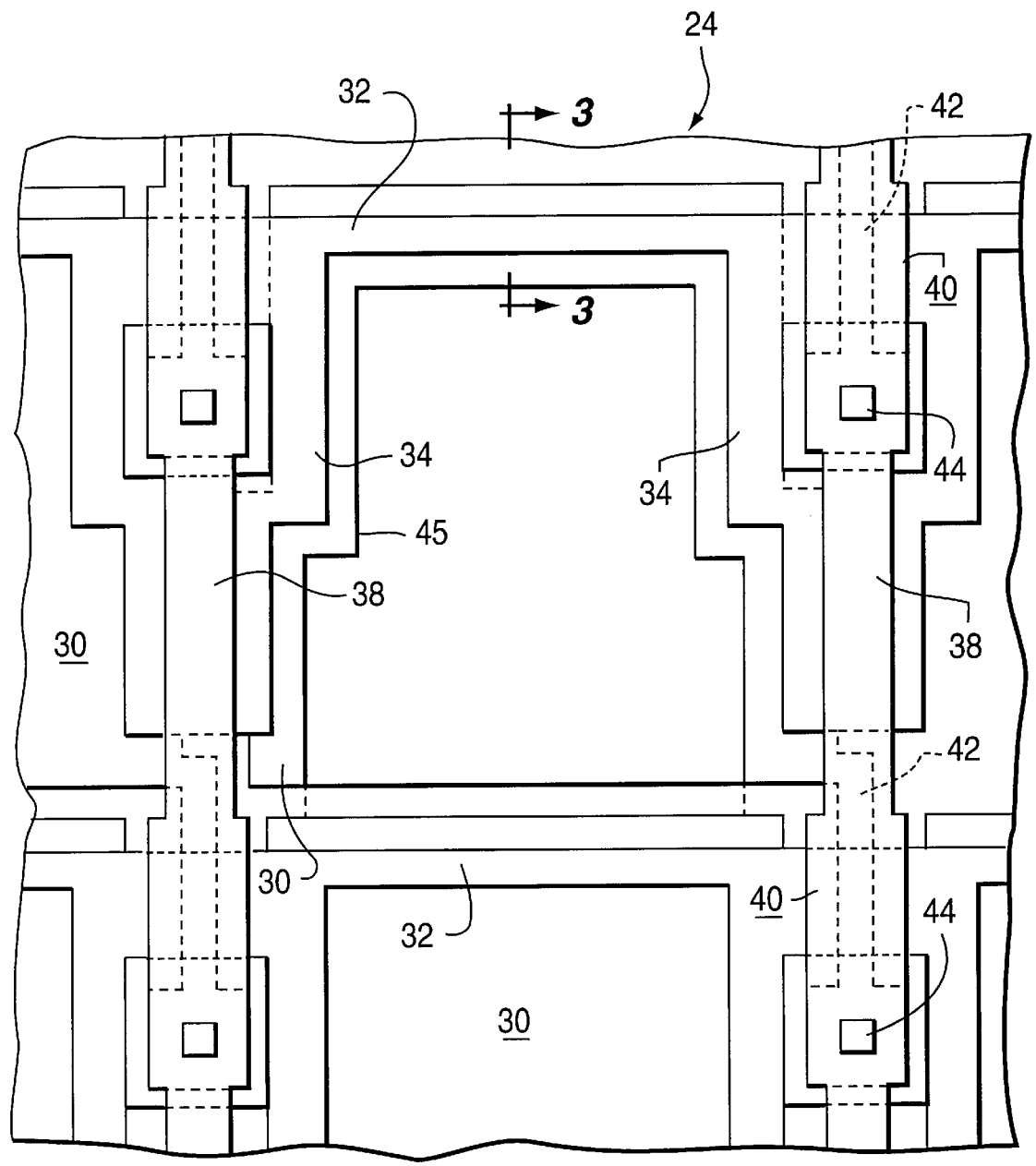
FIG. 2 is a top plan view of an array of one form of pixels of a liquid crystal display in accordance with the present invention.
Figure 3:
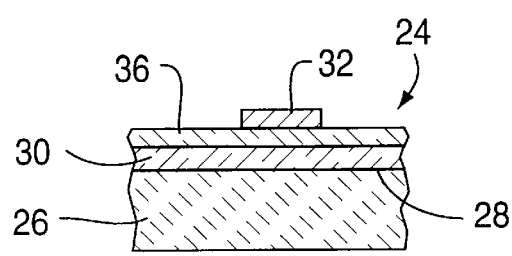
FIG. 3 is a sectional view taken along line 3—3 of FIG. 2.

Referring to FIG. 2, there is shown a top plan view of a portion of a liquid crystal display 24 in accordance with the present invention. The display 24 includes a base plate 26 of an insulating material, such as glass, having on a surface 28 thereof a plurality of substantially rectangular areas 30 of a layer of a conductive material, such as polycrystalline silicon. Each of the conductive areas 30 forms a pixel of the display 24, and will hereinafter be referred to as a pixel area. The pixel areas 30 are arranged in an array of spaced, parallel rows and columns. A separate select line 32 of a conductive material, such is polycrystalline silicon, extends across the top portion of each of the pixel areas 30 in each row of the pixel areas 30. The select line 32 has extensions 34 which extend over and along a side portion of each of the pixel areas 30. The extensions 34 of the select lines 32 are of uniform size and shape. As shown in FIG. 3, the select lines 32, including the extensions 34, are spaced from the pixel areas 30 by a layer 36 of a dielectric material, such as silicon oxide, preferably silicon dioxide. Thus, the select lines 32, including the extension 34, pixel areas 30 and dielectric layer 36 form a capacitor with the select lines 32 and the pixel areas being the plates of the capacitor.

Data lines 38 extend along each column of the pixel areas 30 in the spaces between the columns of the pixel areas 30. The data lines 38 are strips of a conductive material, such as a metal. Each of the data lines 38 is connected to each of the pixel areas 30 in its adjacent column by a MOS transistor 40. Each MOS transistor 40 includes a strip 42 of polycrystalline silicon extending from each of the pixel areas 30. Each select line 32 extends across the strips 42 extending from the pixel areas 30 of the next adjacent row of pixel areas 30. The select lines 32 are insulated from the strips 42 by the dielectric layer 36 and form the gates of the MOS transistors 40. The data lines 38 have connections 44 which extend through openings in the dielectric layer 36 to electrically contact the strips 42 on the side of the select line 32 away from the pixel area 30 to which the strip 42 is connected. Thus, the data lines 38 are electrically connected to the pixel areas 30 through the MOS transistors 40. The portions of the strips 42 on opposite sides of the select lines 32 form the source and drain of the MOS transistor 40.

A layer of a black matrix material, not shown, may be coated over the select lines 32 and the data lines 38 to hide them from being viewed through the display 24. The black matrix layer has openings therethrough over the pixel areas 30 as indicated by the lines 45 so that the active pixel areas are exposed to view.

Figure 1:
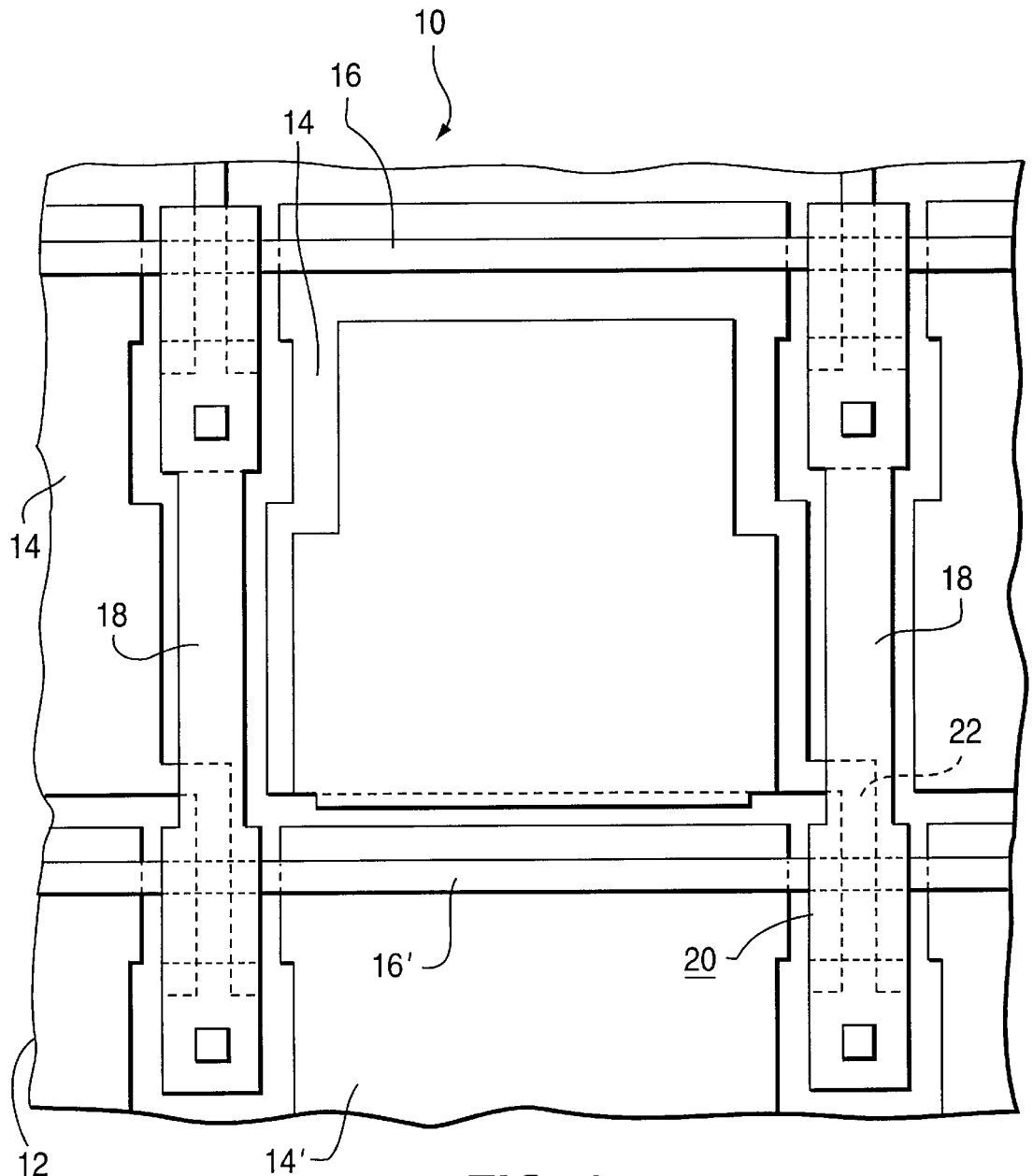
FIG. 1 is a top plan view of a pixel of a liquid crystal display of the prior art.

In the display 24 of the present invention, by having the extensions 34 of the select lines 32 extending over and along the sides of the pixel areas 30 as well as having the select lines 32 extending over and along the top portion of the pixel areas 30 substantially increases, about three times, the capacitance of the capacitor formed between the select lines 32 and the pixel areas 30. For example, for a display with a pixel size of 37 microns and having the select lines extending only across the top portion of the pixel areas as shown in the prior art display of FIG. 1, the capacitance area is about 66 microns square. However, for a display having a pixel area of the same size and with the select lines extending over along the sides of the pixel areas as well as across the top portion of the pixel areas as in the display of the present invention shown in FIG. 2, the capacitance area is 201 microns square. However, even though the capacitance is substantially increased, the aperture of the pixel is not changed substantially. The aperture of the pixel shown in the prior art display of FIG. 1 is about 52% and the aperture of the pixel in the display of the present invention shown in FIG. 2 is about 48%

Another advantage of the display 24 of the present invention is that it can be easily made without causing changes in the capacitance of the capacitor between the select lines and the pixel areas. The various areas forming the pixel areas, select lines and data lines are formed by depositing a layer of the suitable material on the base plate and defining the layer using standard photolithographic techniques and etching to define the layer into the areas, strips and the like. The photolithographic techniques use a mask to define the position of the areas and strips. If the mask is not aligned perfectly, the position of the areas and strips may change. Thus, if the masks used to form either the pixel areas and/or the select lines, including the extensions, are not exactly aligned, the over lap between the extensions of the select lines and the pixel areas may vary. However, if the overlap between the extension at one side of the pixel area is changed, such as being made smaller, the overlap between the extension at the other side of the pixel area will also change in the opposite manner, such as being made larger. Thus, the changes will balance each other so that the total overlap, and thus the capacitance, will remain the same. Therefore, slight misalignment of the masks used to form the pixel areas and/or the select lines will not cause a variation in the capacitance between the select lines and the pixel areas.

Figure 4:
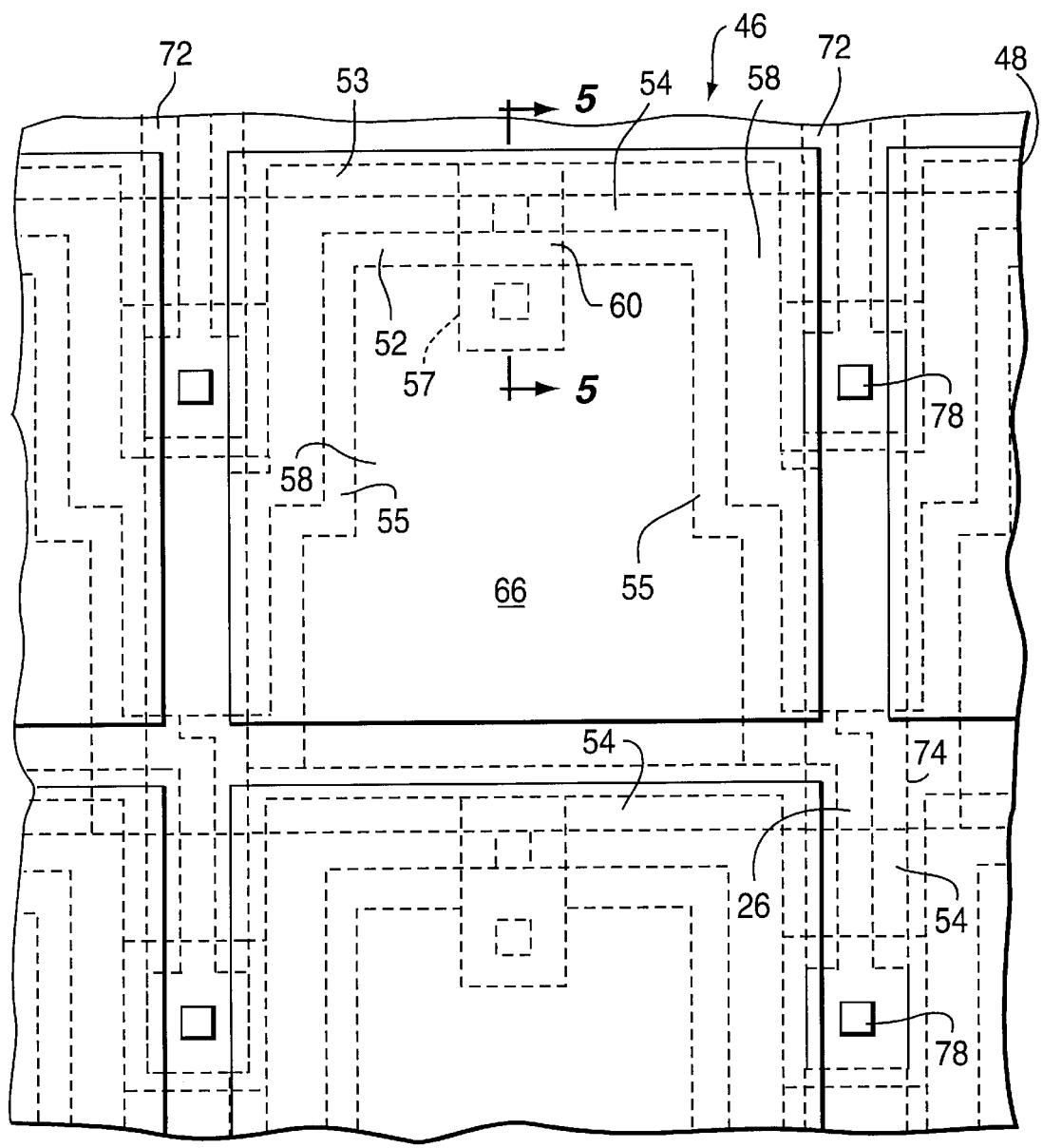
FIG. 4 is a top plan view of an array of another form of pixels of a liquid crystal display in accordance with the present invention.
Figure 5:
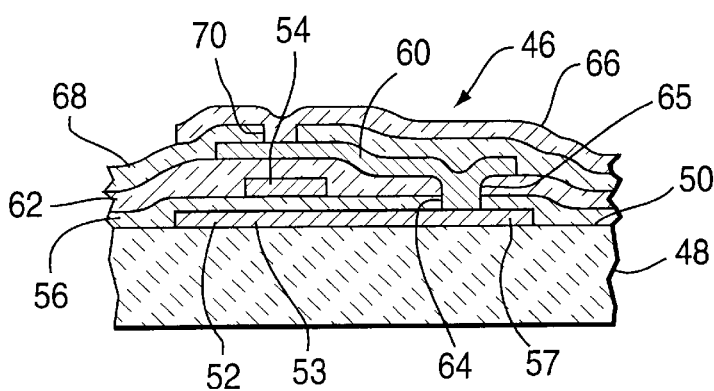
FIG. 5 is a sectional view taken along line 5—5 of FIG. 4.

Referring now to FIG. 4, another form of the liquid crystal display of the present invention is generally designated as 46. Display 46 includes a base plate 48 of an insulating material, such as glass, having on a surface 50 thereof a plurality of areas 52 of a conductive material, such as polycrystalline silicon. The conductive areas 52 form portions of the pixels and are arranged in a plurality of spaced rows and columns. Each of the conductive areas 52 is substantially in the form of a U having a top portion 53, and a pair of spaced, parallel leg portions 55 extending from the top portion 53. A contact extension 57 extends from each top portion 53 between the leg portions 55. A separate select line 54 of a conductive material, such as polycrystalline silicon, extends across the top portion 53 of each of the conductive areas 52 in a separate row. As shown in FIG. 5, the select line 54 is insulated from the conductive areas 52 by a layer 56 of a dielectric material, such as silicon oxide, preferably silicon dioxide, or silicon nitride. The select lines 54 have extensions 58 which extend over and along each leg portion 55 of each of the conductive areas 52. The extensions 58 are also insulated from the conductive areas 52 by the dielectric layer 56. Thus, the select line 54 and its extensions 58 form a capacitor with the conductive area 52.

A contact strip 60 of a conductive material, such as a metal, extends across the top portion 53 of each conductive area 52 and over the contact extension 57. As shown in FIG. 5, the contact strip 60 is insulated from the select line 54 by a layer 62 of an insulating material, such as silicon oxide, preferably silicon dioxide. The contact strip 60 extends through openings 64 and 65 in the dielectric layer 56 and the insulating layer 62 to make electrical contact with the contact extension 57. An area 66 of a conductive material, such as indium tin oxide (ITO) extends over a portion of each of the conductive areas 52 and the area within the U-shaped conductive areas 52. The ITO areas 66, like the conductive areas 52 are arranged in an array of spaced rows and columns and form the active portions of the pixels of the display 46. As shown in FIG. 5, the ITO areas 66 are insulated from the contact strips 60 by a layer 68 of an insulating material, such as silicon oxide, preferably silicon dioxide. Each ITO area 66 extends through an opening 70 in the insulating layer 68 and makes electrical contact with its respective contact strip 60. Thus, each of the ITO pixel areas 66 is electrically connected to a conductive area 52 through a contact strip 60.

Data lines 72 of a conductive material, such as a metal, extend along the sides of the pixel areas 66 between the columns of the pixel areas 66. Each data line 72 is electrically connected to each of the polycrystalline silicon areas 52 in an adjacent column through a separate MOS transistor 74. Each MOS transistor 74 is formed by a strip 76 of polycrystalline silicon extending from a separate one of the polycrystalline silicon areas 52. A select line 54 extends across each of the strips 76 and is insulated therefrom by the insulating layer 56 to form the gate of the MOS transistor 74. The portions of the strip 76 on each side of the select line 54 form the source and drain of the MOS transistor 74. The data line 72 is insulated from the strips 76 and the select lines 54 by the insulating layers 56 and 62. The data line 72 extends through an opening 78 in the insulating layers 56 and 62 to make electrical contact with the strip 76 on the side of the select line 54 away from the polycrystalline silicon area 52 to which the strip 76 is connected.

Each ITO area 66 extends directly up to and may slightly overlap the data lines 72 at each side of each ITO area 66. Each ITO area 66 also overlaps its respective select line 54. By having the ITO areas 66 extending up to and/or overlapping the data lines 72 and the select lines 53, the ITO areas 66 electrically shield the liquid crystal material of the liquid crystal display 46 from fields generated by the data lines 72 and the select lines 52. Such electrical shielding minimizes declination formation leading to improved contrast ratio in small pixels. A layer of a black matrix material may be coated over the select lines 54, data lines 72 and polycrystalline silicon areas 52 leaving at least a portion of each ITO area 66 exposed. The black matrix layer may exist as a single layer having openings therethrough over the ITO areas 66, or as strips extending over the data lines 72 and the selection lines 54 and the polycrystalline silicon areas 52. In the display 46, the portions of the select lines 54 which extend over and across the polycrystalline silicon areas 52 and the extensions 58 form capacitors with the polycrystalline silicon areas 52. The display 46 has a capacitance of over three times that of the capacitance of a display, such as shown in FIG. 1, where the select lines 54 do not have the extensions. Although the capacitance is greatly increased, the active area of the display is not substantially decreased with the aperture of the display 46 being about 51% and the aperture of the display 10 shown in FIG. 1 being 52% for the same size of pixel.

Figure 6:
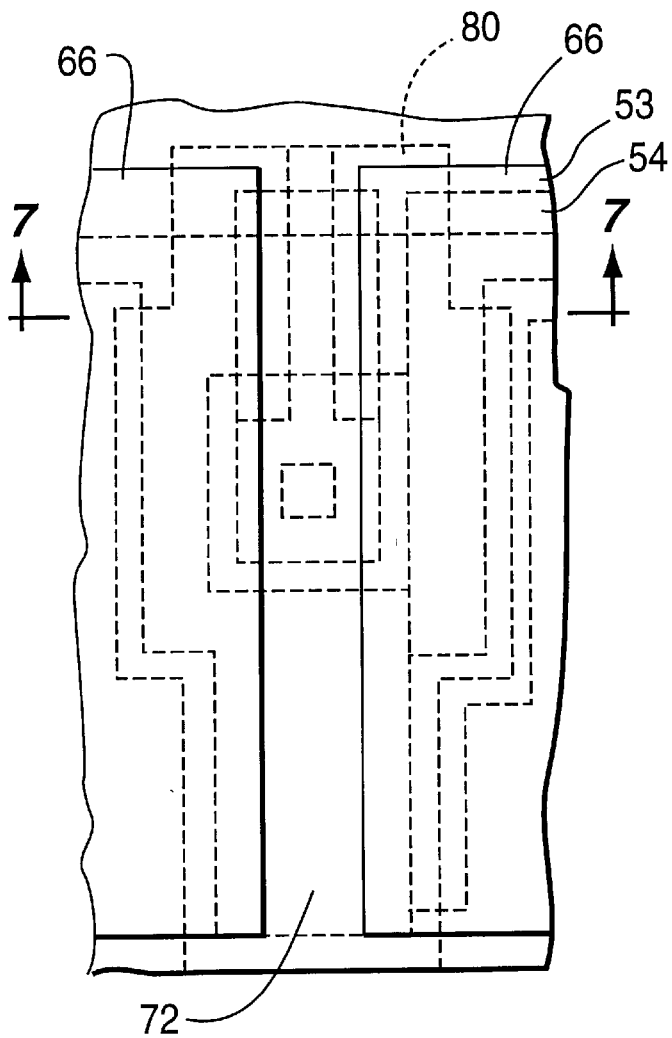
FIG. 6 is a top plan view of a portion of a modification of the array shown in FIG. 4.
Figure 7:
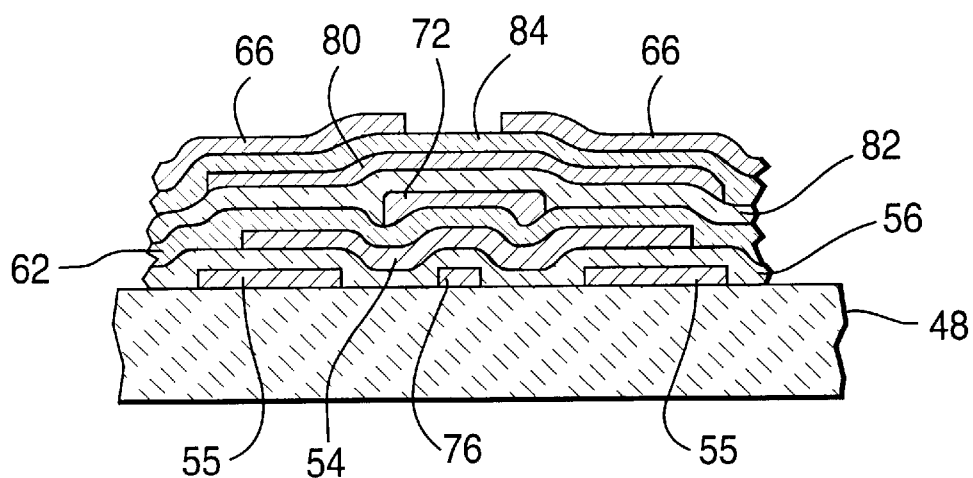
FIG. 7 is a sectional view taken along line 7—7 of FIG. 6.

Referring to FIGS. 6 and 7, there is shown a top plan view and sectional view respectively of a modification of the liquid crystal display 46 shown in FIG. 4. In the liquid crystal display 46 of FIG. 4, the ITO areas 66 extend directly up to or slightly overlap the data lines 72 so as to shield the liquid crystal material from stray fields. However, this also creates strong capacitive coupling between the data lines 72 and the ITO areas 66. To eliminate this capacitive coupling, a metal shielding layer 80 is placed over the data lines 72 and under adjacent portions of the ITO areas 66 as shown in FIG. 6. The shielding layer 80 is insulated from the data lines 72 by a layer 82 of an insulating layer, such as silicon oxide and preferably silicon dioxide, as shown in FIG. 7. The shielding layer 80 is insulated from the ITO areas 66 by a layer 84 of an insulating material, such as silicon oxide and preferably silicon dioxide, as shown in FIG. 7. The shielding layer 80 not only prevents capacitive coupling between the select lines 72 and the ITO areas 66, but also serves as a black matrix layer. Thus, no additional black matrix layer is required.

Thus, there is provided by the present invention a liquid crystal display in which the capacitance of the capacitor connected to each pixel is substantially increased to provide for greater stability of the display. Even though the capacitance is increased, the active area of the display is not substantially decreased since the increase in the capacitance is achieved using the wasted regions of the display between the columns of the pixels. Furthermore, the increase in capacitance is achieved without increasing the number of steps necessary to make the display since the extensions to the select lines are formed during the same step that the polycrystalline silicon layer which forms the select lines is defined.

What is claimed is:

1. A liquid crystal display comprising:
   a base plate having a surface;
   at least one pixel on said surface of the base plate, said pixel including a conductive silicon region having an upper surface and a plurality of sides;
   a dielectric layer formed on the upper surface of the silicon region, the dielectric layer having an upper surface and being formed from a material selected from a group consisting of silicon oxide and silicon nitride;
   a conductive select line of substantially uniform width partially covering the upper surface of the dielectric layer so as to overlay a portion of said region adjacent to one side of the region;
   at least one conductive extension from the select line partially covering the upper surface of the dielectric layer so as to overlay another portion of the region adjacent to another side of the region;
   said select line and extensions forming, with the region, a capacitor which is electrically connected to said region; and
   a data line of a conductive material extending along a side of the region and electrically connected to the region.

2. The display of claim 1 wherein the select line has two conductive extensions extending therefrom over and along different sides of the region, and the dielectric layer is between the select line and both extensions and the region.

3. The display of claim 2 in which the data line extends along the same side of the region as one of the extensions of the select line.

4. The display of claim 3 including a MOS transistor connected between the data line and the region.

5. The display of claim 4 in which the region, the select line and the extensions of the select line are of polycrystalline silicon.

6. The display of claim 5 in which the conductive region is substantially rectangular, the select line extends over and along the region adjacent one side of the region, the extensions of the select line extend from the select line over and along the region adjacent two opposite sides of the region, and the portion of the region between the select line and the extensions is the active area of the pixel.

7. A liquid crystal display comprising:
   a base plate having a surface;
   a plurality of pixels on said surface of the base plate and arranged in an array of spaced rows and columns, each of said pixels including a conductive silicon region having an upper surface and a plurality of sides;
   a plurality of dielectric layers formed on the upper surfaces of the silicon regions of the plurality of pixels, each dielectric layer having an upper surface and being formed from a material selected from a group consisting of silicon oxide and silicon nitride;
   a separate conductive select line of substantially uniform width partially covering the upper surfaces of the dielectric layers in each of the rows of pixels so as to overlay a portion of each of the regions in the row adjacent to one side of each of the regions;

a plurality of conductive extensions extending from each of the select lines to partially cover the upper surface of the dielectric layer so as to overlay another side of each of the regions in the respective rows of pixels;

said select lines and the extensions forming with the conductive regions capacitors which are electrically connected to the conductive regions; and a separate data line of a conductive material extending along each column of pixels and electrically connected to each conductive region in its respective column of pixels.

8. The display of claim 7 wherein each of the select lines has two extensions extending therefrom over and along different sides of each of the conductive regions in its respective row of pixels, and the dielectric layer extends between the select lines and extensions and the conductive regions.

9. The display of claim 8 in which the extensions of the select lines are substantially parallel to the data lines.

10. The display of claim 9 including a separate MOS transistor electrically connected between each of the data lines and each of the conductive regions in the respective column of the pixels.

11. The display of claim 10 in which each of the conductive regions, the select lines and the extensions of the select lines are of polycrystalline silicon.

12. The display of claim 11 in which each of the conductive regions is substantially rectangular, the select line extends over and along the conductive regions in its respective row of pixels adjacent one side of the conductive regions, the extensions of the select lines extend over and along each conductive region along opposite sides of the conductive region and the portion of each conductive region between the select line and the extensions of the select line is the active region of the pixel.

13. A liquid crystal display comprising:

a base plate having a surface;

at least one pixel on said surface of the base plate, said pixel including a conductive silicon region having an upper surface and a plurality of sides;

a dielectric layer formed on the upper surface of the silicon region, the dielectric layer having an upper surface and being formed from a material selected from a group consisting of silicon oxide and silicon nitride;

a conductive select line of substantially uniform width partially covering the upper surface of the dielectric layer so as to overlay and be entirely above a portion of said region adjacent to one side of the region;

at least one conductive extension from the select line partially covering the upper surface of the dielectric layer so as to overlay another portion of the region adjacent to another side of the region;

said select line and extensions forming, with the region, a capacitor which is electrically connected to said region; and a data line of a conductive material extending along a side of the region and electrically connected to the region.

* * * * *